US007457854B2

(12) United States Patent
Trisno et al.

(10) Patent No.: US 7,457,854 B2
(45) Date of Patent: *Nov. 25, 2008

(54) AUTOMATIC ASSIGNMENT OF ADDRESSES TO NODES IN A NETWORK

(75) Inventors: Tjandra Trisno, San Jose, CA (US); Chris L Freckmann, Sunnyvale, CA (US)

(73) Assignee: Forster Energy LLC, Las Vegas, NV (US)

( * ) Notice: Subject to any disclaimer, the term of this patent is extended or adjusted under 35 U.S.C. 154(b) by 71 days.

This patent is subject to a terminal disclaimer.

(21) Appl. No.: 11/496,221

(22) Filed: Jul. 31, 2006

(65) Prior Publication Data

US 2006/0265482 A1    Nov. 23, 2006

Related U.S. Application Data

(63) Continuation of application No. 09/870,880, filed on May 30, 2001, now Pat. No. 7,096,257.

(51) Int. Cl.
*G06F 15/177* (2006.01)
(52) U.S. Cl. ........................................ 709/220; 709/222
(58) Field of Classification Search ................. 709/220, 709/222
See application file for complete search history.

(56) References Cited

U.S. PATENT DOCUMENTS

| 4,210,779 | A | 7/1980 | Simokat |
| 4,768,186 | A | 8/1988 | Bodell |
| 4,800,555 | A | 1/1989 | Foschini |
| 5,060,310 | A | 10/1991 | Frisch et al. |
| 5,339,184 | A | 8/1994 | Tang |
| 5,459,607 | A | 10/1995 | Fellows et al. |
| 5,481,542 | A | 1/1996 | Longston et al. |
| 5,495,232 | A | 2/1996 | Kochem et al. |
| 5,504,747 | A | 4/1996 | Sweazey |
| 5,612,806 | A | 3/1997 | Su et al. |
| 5,678,198 | A | 10/1997 | Lemson |
| 5,832,387 | A | 11/1998 | Bae et al. |

(Continued)

FOREIGN PATENT DOCUMENTS

JP    09022038 A    1/1997

(Continued)

OTHER PUBLICATIONS

Blumenthal, Daniel J. et al., "Fiber-Optic Lins Supporting Broadband Data and Subcarrier Multiplexed Control Channels and the Impact of MMIC Photonic/Microwave Interfaces," IEEE Transactions on Microwave Theory and Techniques (Aug. 1997), vol. 45, No. 8, pp. 1443-1451.

(Continued)

*Primary Examiner*—Tonia L. M. Dollinger
*Assistant Examiner*—David E Martinez

(57) ABSTRACT

Each node in the network broadcasts it unique identifier to the other nodes. Each node assigns a different network address to each of the nodes based on the unique identifier received from the node. However, each node assigns the network addresses in a common predetermined manner. Thus, each node arrives at the same assignment of network addresses. In a preferred embodiment, the assignment of network addresses is maintained as an address table at each node.

15 Claims, 15 Drawing Sheets

U.S. PATENT DOCUMENTS

| | | | |
|---|---|---|---|
| 5,892,972 | A | 4/1999 | Narahari et al. |
| 5,956,165 | A | 9/1999 | Fee et al. |
| 6,061,739 | A | 5/2000 | Reed et al. |
| 6,088,726 | A * | 7/2000 | Watanabe .................. 709/220 |
| 6,094,298 | A | 7/2000 | Luo et al. |
| 6,160,649 | A | 12/2000 | Horiuchi et al. |
| 6,236,726 | B1 | 5/2001 | Darveau |
| 6,271,942 | B1 | 8/2001 | Sasai et al. |
| 6,289,511 | B1 | 9/2001 | Hubinette |
| 6,430,148 | B1 | 8/2002 | Ring |
| 6,529,303 | B1 | 3/2003 | Rowan et al. |
| 6,603,822 | B2 | 8/2003 | Brede et al. |
| 6,643,470 | B1 | 11/2003 | Iida et al. |
| 6,697,649 | B1 | 2/2004 | Bennet et al. |

FOREIGN PATENT DOCUMENTS

| | | | |
|---|---|---|---|
| JP | | 09098155 A | 4/1997 |
| WO | | WO00/24166 | 4/2000 |
| WO | | WO00/31921 | 6/2000 |

OTHER PUBLICATIONS

Liew, Soung C. et al., "A Broad-Band Optical Network Based on Hierarchical Multiplexing of Wavelengths and RF Subcarriers," Journal of Lightwave Technology (Nov. 1989), vol. 7, No. 11, pp. 1825-1838.

R. Droms, RFC 2131—Dynamic Host Configuration Protocol, Network Working Group, Technical report, IETF, Mar. 1997, www.ftp.rfc-editor.org/in-notes/rfc2131.txt.

Thomson, S. et al.; Ipv6 Stateless Address Autoconfiguration, Network Working Group (Dec. 1998) http://www.ietf.org/rfc/rfc2462.txt.

Cheshire, S. et al.; Dynamic Configuration of Ipv4 Link-Local Addresses, Internet Proposed Standard RFC 3927, May 2005.

* cited by examiner

| Node | Unique Identifier (MAC Address) | Network Address (IP Address) |
|---|---|---|
| 100H | 10.10.2 | 127.0.0.0 |
| 100I | 10.10.3 | 127.0.0.1 |
| 100J | 10.11.7 | 127.0.0.3 |
| 100K | 10.10.9 | 127.0.0.2 |

FIG. 4A

| Node | Unique Identifier (MAC Address) | Network Address (IP Address) | Time to Live | Expired |
|---|---|---|---|---|
| 100H | 10.10.2 | 127.0.0.0 | 15 | 0 |
| 100I | 10.10.3 | 127.0.0.1 | 0 | 1 |
| 100J | 10.11.7 | 127.0.0.3 | 15 | 0 |
| 100K | 10.10.9 | 127.0.0.2 | 10.5 | 0 |

FIG. 4B

| Node | Unique Identifier (MAC Address) | Network Address (IP Address) | Time to Live | Expired |
|---|---|---|---|---|
| 100H | 10.10.2 | 127.0.0.0 | 15 | 0 |
| 100J | 10.10.7 | 127.0.0.3 | 15 | 0 |
| 100K | 10.11.9 | 127.0.0.1 | 15 | 0 |
| 100L | 10.10.12 | 127.0.0.2 | 15 | 0 |

| Node | Unique Identifier (MAC Address) | Network Address (IP Address) | Time to Live | Expired |
|---|---|---|---|---|
| 100H | 10.10.2 | 127.0.0.0 | 15 | 0 |
| 100I | 10.10.3 | 127.0.0.1 | 15 | 0 |
| 100J | 10.11.7 | 127.0.0.2 | 0 | 1 |
| 100K | 10.10.9 | 127.0.0.3 | 0 | 1 |

FIG. 6B

| Node | Unique Identifier (MAC Address) | Network Address (IP Address) | Time to Live | Expired |
|---|---|---|---|---|
| 100H | 10.10.2 | 127.0.0.0 | 15 | 0 |
| 100I | 10.10.3 | 127.0.0.1 | 15 | 0 |
| 100K | 10.10.9 | 127.0.0.2 | 15 | 0 |

FIG. 6C

| Node | Unique Identifier (MAC Address) | Network Address (IP Address) | Time to Live | Expired |
|---|---|---|---|---|
| 100H | 10.10.2 | 127.0.0.0 | 15 | 0 |
| 100I | 10.10.3 | 127.0.0.1 | 15 | 0 |
| 100J | 10.11.7 | 127.0.0.2 | 0 | 1 |
| 100K | 10.10.9 | 127.0.0.3 | 15 | 0 |

AUTOMATIC ASSIGNMENT OF ADDRESSES TO NODES IN A NETWORK

CROSS-REFERENCE TO RELATED APPLICATION

This application is a continuation of application Ser. No. 09/870,880, filed May 30, 2001, now U.S. Pat. No. 7,096,257, the entirety of which is incorporated herein by reference.

This application claims the benefit of U.S. Provisional Patent Application Ser. No. 60/211,849, "Control Channel for Optical Communication Networks utilizing Frequency Division Multiplexing", by David A. Pechner et al., filed Jun. 15, 2000, which subject matter is incorporated herein by reference.

BACKGROUND OF THE INVENTION

1. Field of the Invention

This invention relates generally to the field of networking. More specifically, the invention relates to the automatic configuration of addresses within a network.

2. Description of the Related Art

The use of computers and other electronic devices (e.g., fax machines, network-compatible video game consoles, Internet-ready televisions and radios, video cameras and displays, etc.) in the home and the office continues to grow. For example, businesses use these devices to quickly gather, process and distribute information. This allows their employees to easily access and share information with other employees regardless of their location. As another example, individuals use these devices to access the Internet and to communicate with people all across the world through the use of email and other applications. As a result of this increasing use, the demand for networks interconnecting the devices and providing communications between the devices also continues to grow. Today's networks are capable of connecting devices which are next to each other on a desk as well as devices which are separated by thousands of miles.

Sophisticated networks typically do not make direct point to point connections between individual devices. In other words, if a computer in New York desires to communicate with a computer in San Francisco, the network connection typically is not a permanent, dedicated line from one computer to the other. Instead, the network typically includes a number of interconnected nodes, often organized in a hierarchical fashion, and communications passes through the nodes. For example, in packet-based networks, messages are divided into packets, each of which makes its way from the New York computer through the network nodes to the San Francisco computer.

As the network grows, the number of nodes in the network increases and the distance between nodes on opposite ends of the network also increases. As a result, it becomes more difficult to manage the network. For example, one step in managing a network is to assign addresses to nodes within the network. In many networks, part or all of the assignment of addresses is performed manually; a network administrator or some other individual manually assigns addresses to the nodes in the network and/or manages the addressing in the nodes. If nodes are added to or removed from the network, either intentionally or by equipment failure, the administrator generally must manually update the addressing in the network.

One example of a network is the Internet, which connects millions of computers together and facilitates the sharing of information across the globe. As the Internet continues to grow, the Internet Protocol (IP) is becoming a de facto standard for networking protocols. As a result, many applications are being developed for IP networks. However, the IP protocol is a public network protocol that is used in networks consisting of a large number of nodes.

In order to manage these nodes, network administrators and servers are used to manage groups of nodes. The network administrators set up the addressing in the nodes, create subnets and handle the general organization of the nodes. The servers store addressing information about the network as a whole. By storing the addressing information in a server, the nodes in the network can access the server to obtain addressing information and thus do not have to store the addressing information in each node. This significantly reduces the amount of storage needed in each node, as the address tables are quite large for networks that contain a large number of nodes. However, it also introduces a single point of failure in the network since the nodes will not operate correctly if the server is inoperable.

For smaller, self-contained or private networks, the traditional approach to IP configuration and management is not efficient. When a network only contains a small number of nodes, a server is not required since each node can easily store the addressing information for each of the other nodes in the network. In addition, if the nodes are separated by large distances, it is be beneficial for the network to operate without requiring manual intervention by a network administrator. However, due to the large number of applications written for IP networks and the widespread use of IP, it is beneficial to use the IP protocol in these small, private, self-contained networks. For example, Kestrel Solutions, based in Mountain View, Calif., provides products that can be configured to provide high-speed metropolitan area network (MAN) backbones. These products are typically configured in private networks with relatively few number of nodes located large distances from one another. It is desirable to use the IP protocol with these products, however, the management overhead associated with IP networks is undesirable.

What is needed is an approach to automatically assign addresses to nodes in a network that does not require input by users or network administrators. The approach preferably also automatically updates the assignment of addresses as nodes are added to or removed from the network.

SUMMARY OF THE INVENTION

In accordance with the present invention, a method for assigning a different network address to each node in a network includes the following steps. Each node in the network broadcasts a unique identifier for the node to the other nodes and receives the unique identifiers for the other nodes. Each node's unique identifier is different. Each node assigns a different network address to each of the nodes based on the unique identifier received from the node. However, each node assigns the network addresses in a common predetermined manner. Thus, since each node has received the same set of unique identifiers and then assigns network addresses in the same manner, each node will arrive at the same assignment of network addresses to nodes. In a preferred embodiment, the assignment of network addresses is maintained as an address table in each node.

In another aspect of the invention, the nodes periodically broadcast and receive the unique identifiers. When unique identifiers are received, the node consults its address table. If a record containing the unique identifier already exists, the record is updated. For example, in one embodiment, the record includes a time to live field indicating the time to expiration for the record. Updating the record includes resetting the time to live field. If a record containing the unique identifier does not already exist, then one is created. Each node reassigns the network addresses in the records based on the unique identifiers in the records. Each node makes the assignments in the same manner, thus resulting in address tables which are the same across the network.

In a preferred embodiment, the nodes are coupled in a ring configuration. In addition, the unique identifier includes a MAC address and the network address includes an IP address. In other words, each node assigns IP addresses on the basis of MAC addresses received for the other nodes. The MAC addresses are broadcast around the ring using a store and forward approach. When a node receives a MAC address, it stores the MAC address. The node also forwards the MAC address to the next node on the ring, if the node did not originate the broadcast of the MAC address. If it did originate the broadcast, then there is no forwarding. When a MAC address is received, if a record for the MAC address already exists, the time to live field for the record is reset. If a record does not exist, then one is created. A record is marked as expired when its time to live field expires. Expired records are purged and IP addresses reassigned to the unexpired records only when a new record is created, for example when a new MAC address is received.

The present invention has the advantage of relieving a network administrator of the task of manually assigning network addresses. In addition, it allows private, self-contained networks to use the IP network protocol without requiring the use of a server or network administrator to manage the nodes in the network.

BRIEF DESCRIPTION OF THE DRAWINGS

The invention has other advantages and features which will be more readily apparent from the following detailed description of the invention and the appended claims, when taken in conjunction with the accompanying drawing, in which:

FIGS. 4A-C are illustrations of address tables used with the methods of FIGS. 2 and 3;

FIGS. 6A-D are illustrations of address tables illustrating a proxy mechanism.

DETAILED DESCRIPTION OF THE PREFERRED EMBODIMENTS

FIGS. 1A-E are block diagrams illustrating various network topologies suitable for use with the present invention. The invention is not limited to these topologies. Any network topology including topologies in which different networks are linked to each other, can be automatically configured using the present invention. Each of these network topologies includes a number of nodes 100A-X (collectively or generically, nodes 100) which are coupled to each other via network segments. Examples of nodes 100 include personal computers, workstations, servers, other types of computers, routers, switches, and other networking devices. The network segments include any communications medium that can exchange data packets between the nodes, including for example electrical wires, coaxial cable, optical fibers, and wireless.

The nodes 100 in the network communicate with each other by transferring information over the network segments, for example in data packets. Each of the nodes 100 in the network has a network address that is unique to that node. This address allows each node 100 to send information to every other node 100 in the network by attaching the appropriate network address for the destination node to the information. The information is then routed through the network to the node whose network address matches the network address attached to the information.

For example in one approach, each node knows the network address for each of the other nodes in the network. Usually, these network addresses are stored locally in an address table in each node. The address table maps each node in the network with its network address. Thus, when a source node wants to transmit information to another node in the network, the source node looks up the destination node in the address table and finds the appropriate network address for that node. The network address is inserted into a data packet containing the information to be transmitted. The data packet is forwarded over the network segments to the node with corresponding destination address. In a preferred embodiment, the address table is implemented in a sorted list. However, the address table can be implemented in other ways, including linked lists, arrays, databases, and dedicated hardware.

Figure 1A:
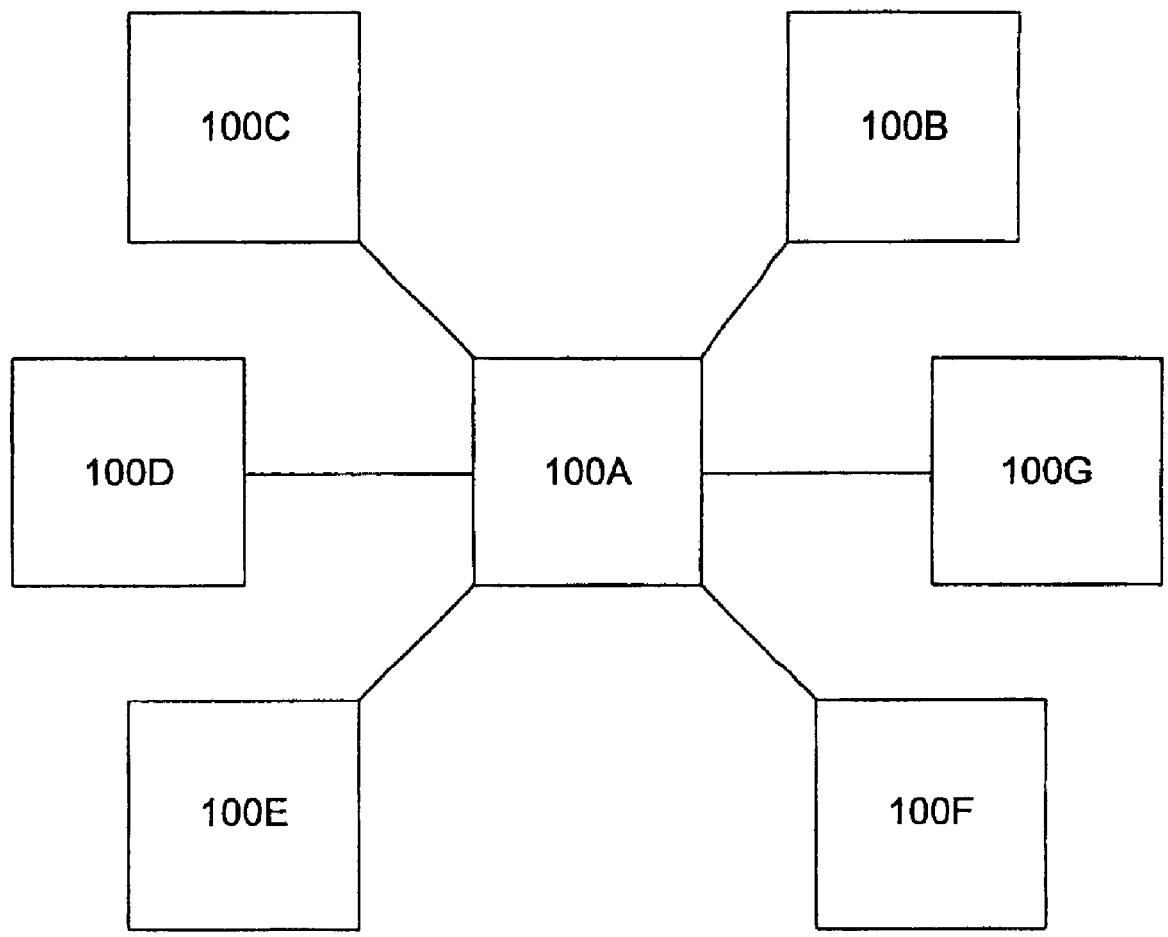
FIGS. 1A-E are block diagrams illustrating various network topologies suitable for use with the present invention.

In FIG. 1A, nodes 100A-G are coupled together in a star configuration, with node 100A at the center of the star. If one of the nodes 100A-G wants to communicate information to another node 100A-G, it forwards the data packet containing the information and destination address to node 100A. If the information is destined for node 100A, the transfer of information is complete. On the other hand, if one of the other nodes 100B-G is the destination for the information, node 100A forwards the information to the appropriate node.

Figure 1B:
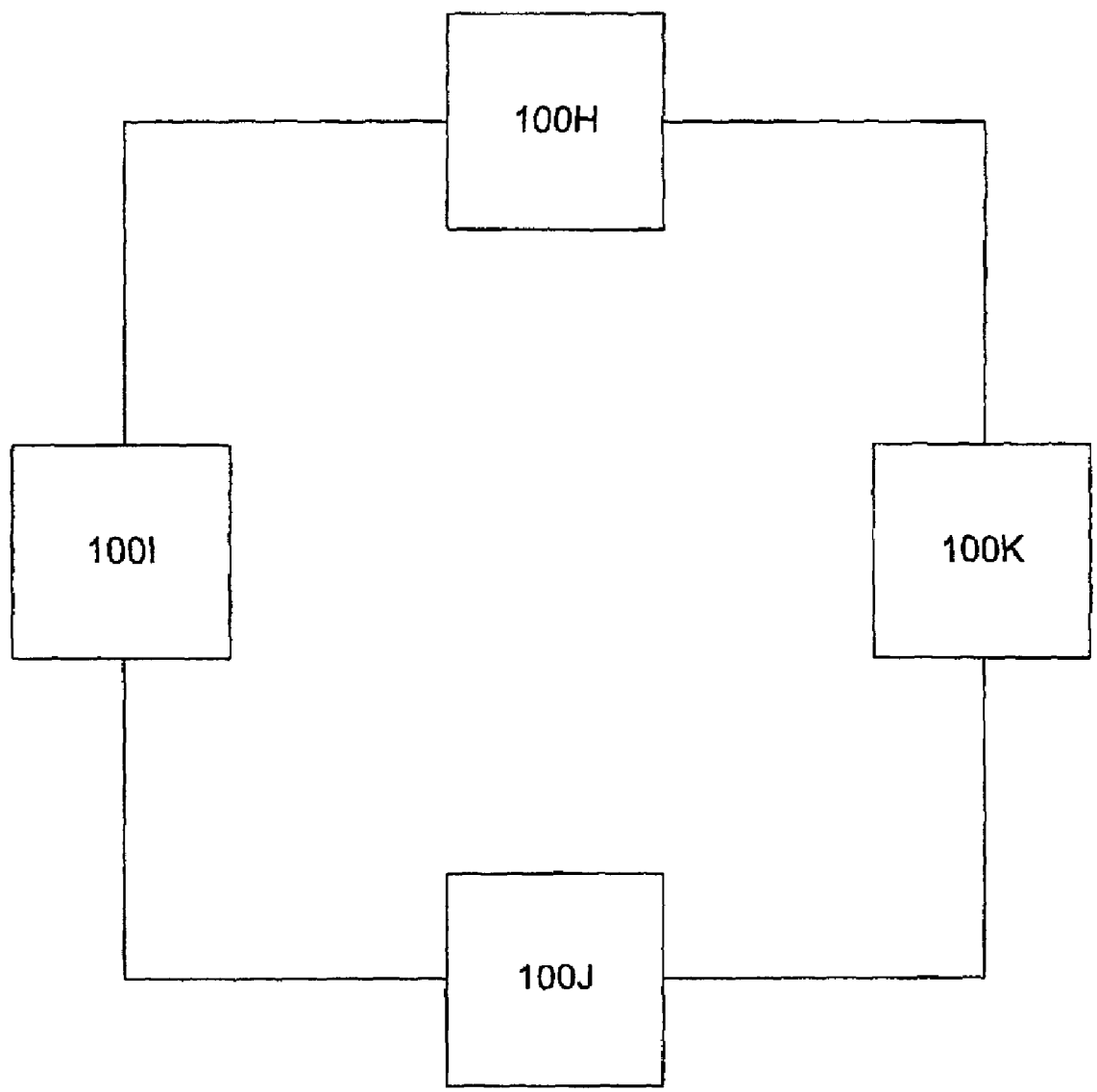

In FIG. 1B, nodes 100H-K are coupled together in a ring configuration. Information is passed around the ring from node to node until it reaches the destination node. For example, each node might examine an incoming data packet. If the destination address contained in the data packet matches the network address for the node, the node stores the data packet. Otherwise, it forwards the data packet to the next node on the ring.

Figure 1C:
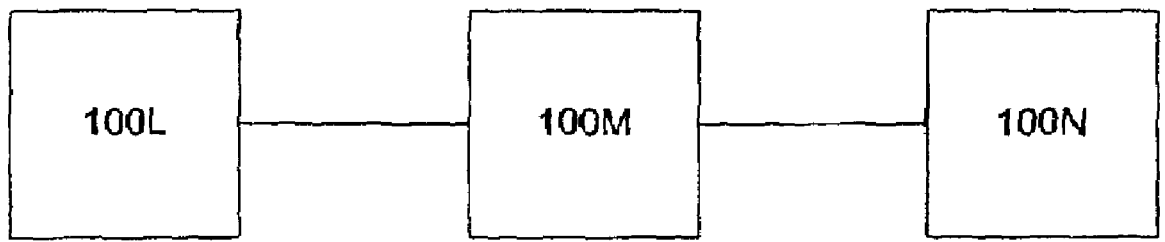

In FIG. 1C, nodes 100L-N are coupled together in a linear chain configuration. In this example, the information is simply forwarded in the direction of the destination and is passed from node to node until received by the destination node.

Figure 1D:
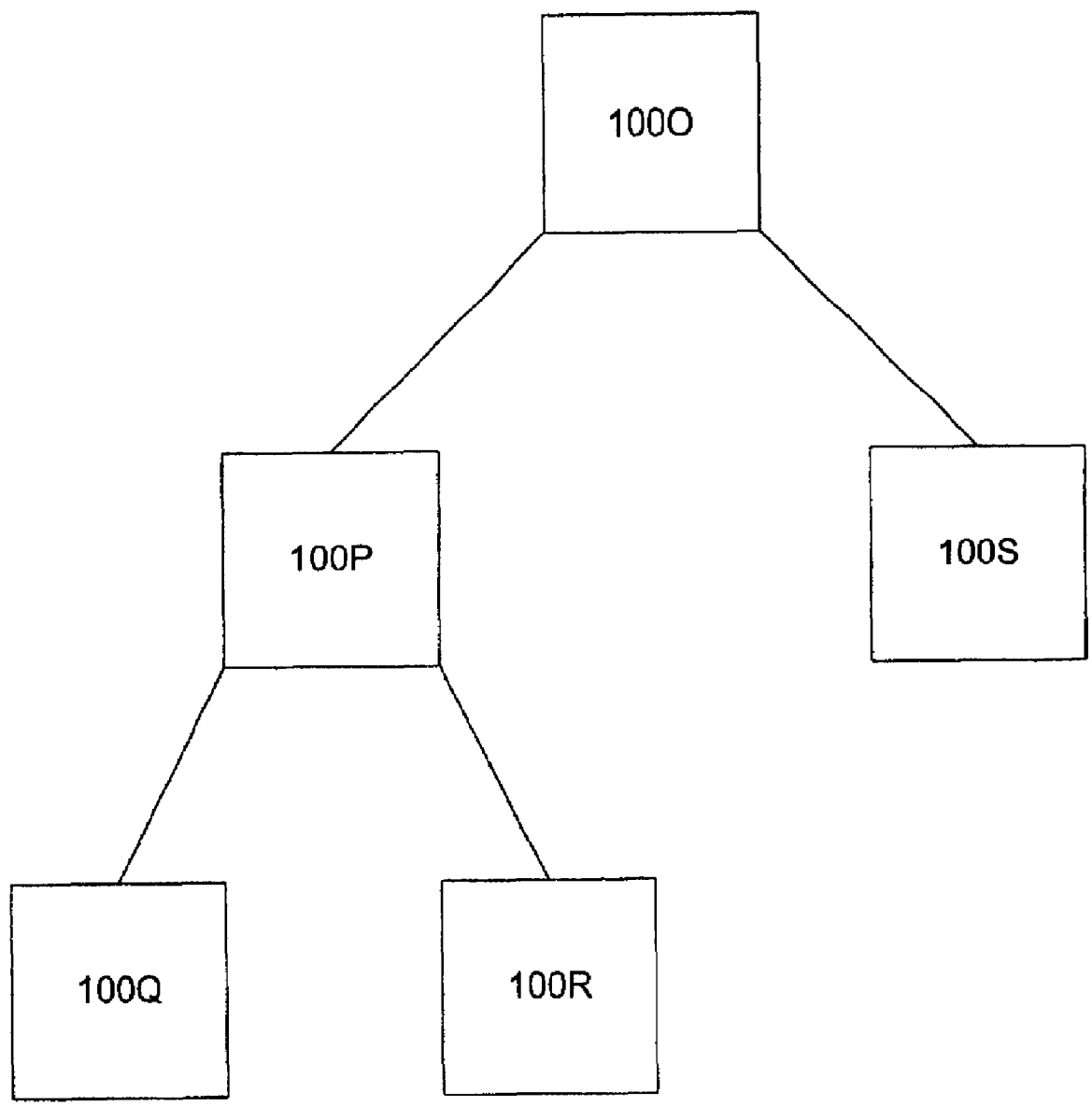

In FIG. 1D, nodes 100O-S are configured in a tree structure, with node 100O at the root and nodes 100Q-S as the leaves. In this configuration, information is transferred up and down the branches of the tree until it reaches the appropriate destination node.

Figure 1E:
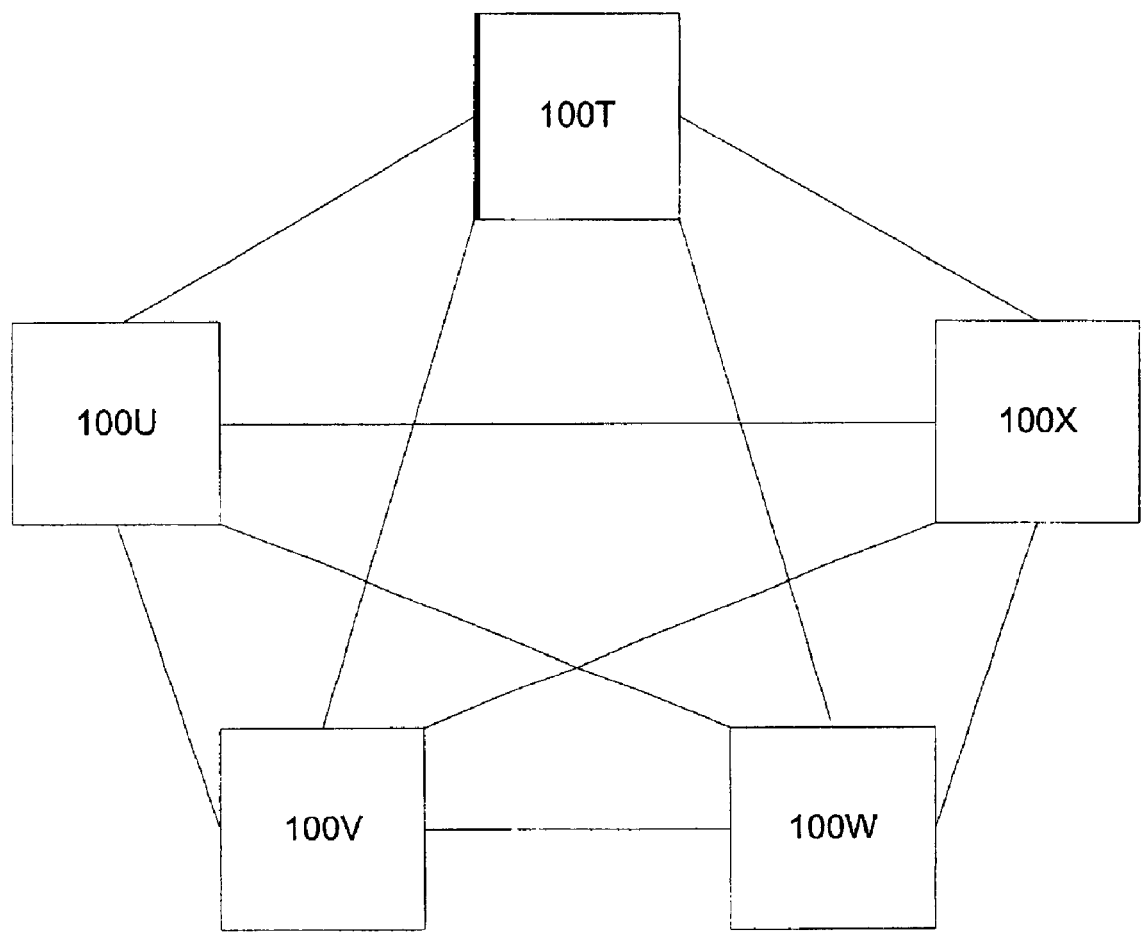

In FIG. 1E, nodes 100T-X are coupled in a fully meshed configuration. In this configuration, each node has a direct connection to every other node, therefore, the source node transfers information directly to the destination node. The invention also works in a partially meshed network configuration wherein the network is not fully meshed but does have multiple redundant connections between the nodes.

In a preferred embodiment, each of the nodes 100 is a device from the TalonMX family of products, available from Kestrel Solutions, Inc. of Mountain View, Calif., and the nodes 100 are connected in a ring configuration to form part of a public switched telephone network. For a general explanation of these types of devices, see for example U.S. patent application Ser. No. 09/405,367, "Optical Communications Networks Utilizing Frequency Division Multiplexing," by Michael W. Rowan et al., filed Sep. 24, 1999, which is incorporated herein by reference. For convenience, this particular example shall be referred to as the Talon ring embodiment.

Before the nodes 100 in a network can fully communicate with each other, addressing is established. In other words, each node 100 receives a network address which is used for communications and the nodes must somehow have access to the other nodes' addresses. In the embodiments described below, the nodes themselves are configured to automatically set up the appropriate network addressing throughout the network. Each node maintains its own address table. It typically will update its address table when the network first comes on-line and also when nodes are added or removed from the network. Once the network addressing is established, each node in the network can communicate with every other node in the network.

Figure 2:
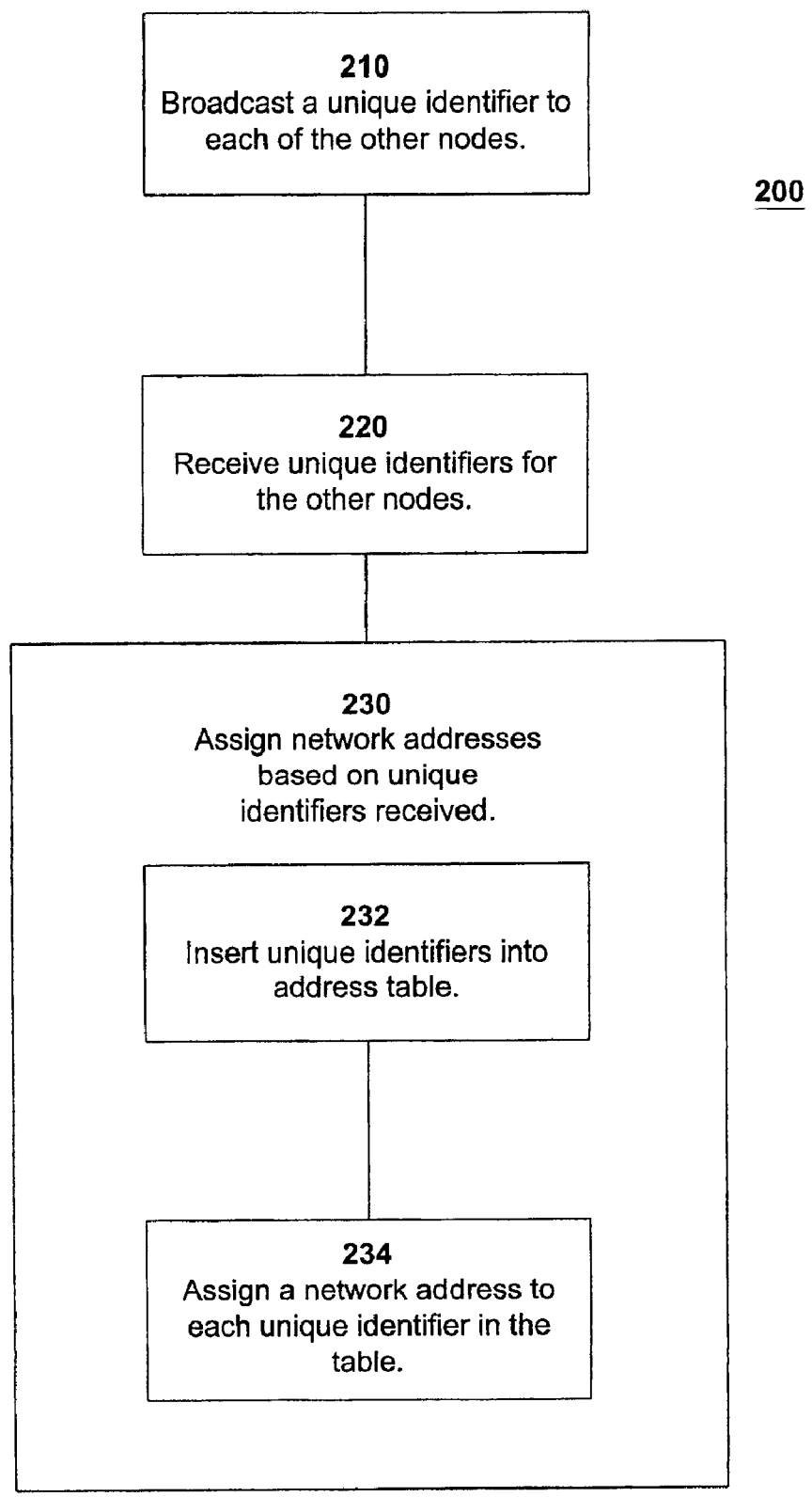
FIG. 2 is a flow diagram illustrating a method for assigning addresses to nodes according to the invention.

FIG. 2 is a flow diagram illustrating a method 200 for assigning addresses to nodes according to the invention. In this embodiment, each node 100 in the network implements the steps detailed in method 200. Method 200 is described below in connection with the ring configuration of FIG. 1B but is generally applicable to any network topology.

In steps 210 and 220, each node 100 broadcasts 210 its unique identifier to each of the other nodes in the network and receives 220 the unique identifiers for the other nodes. Each node has a different unique identifier. For example, in the ring configuration of FIG. 1B, node 100I broadcasts 210 its unique identifier to nodes 100H, 100J and 100K. The broadcast packet is received 220 and stored by nodes 100H, 100J and 100K. Each of nodes 100H, 100J and 100K similarly broadcasts 210 its unique identifier to the other nodes. In this way, each node 100 receives 220 the unique identifiers for all of the other nodes. In addition, each node 100 can construct a list of the unique identifiers for all of the nodes 100 in the network, including itself; and each list should be the same since each node should have received the same set of unique identifiers.

In step 230, each node 100 assigns a different network address to each of the nodes, based on the unique identifier received from the node. However, all nodes, 100 make this assignment in a common, predetermined manner. For example, assume that the unique identifiers and network addresses can each be numerically ordered, for example from lowest to highest or vice versa. In one approach, the lowest network address is assigned to the node with the lowest unique identifier, the second lowest network address is assigned to the node with the second lowest unique identifier, and so on. The network addresses may be assigned in any manner so long as all of the nodes use the same approach.

Each node should have a different unique identifier. However, if the same unique identifier is received from different nodes, in one embodiment, this situation is detected by the nodes and is reported to a network administrator. The addresses are assigned as described above, including assigning an address to the problem unique identifier. However, communications to the nodes with the duplicate unique identifiers may be problematic until the problem is resolved.

At the end of process 200, each node 100 will have independently made an assignment of network addresses to nodes. However, the assignments will all be the same. That is, each of the nodes 100H-K will have assigned the same network address to node 100H, to node 100I, etc. This is because each node begins with the same set of unique identifiers and then uses the same approach to assign network addresses based on the unique identifiers.

This approach is advantageous because it does not require the use of a network administrator to manually configure the network addresses for each of the nodes. In addition, the use of a server is not required since each of the nodes has the addressing information for each of the other nodes in the network. In other words, each node has the same information as all of the other nodes. Thus, if a node fails, the other nodes in the network will continue to operate correctly.

In the example of the Talon ring embodiment, method 200 is implemented as follows. The unique identifiers are Media Access Control (MAC) addresses, and the network addresses are IP addresses. A MAC address is a unique 6 byte (48 bit) address that is burned into each networking product by the manufacturer in order to uniquely identify that particular product. Manufacturers take great care to ensure that each MAC address burned into a product is unique.

In steps 210 and 220, the MAC addresses are transmitted around the ring using a store and forward approach. Specifically, each node 100 inserts its MAC address into a broadcast data packet, which it then transmits to its neighbor. For example, assuming that traffic only travels clockwise in FIG. 1B, node 100I would transmit its data packet to node 100H. Node 100H stores the MAC address in the packet and then forwards the data packet to the next node, node 100K. This continues until each node in the network has received the broadcast packet. In one approach, when the broadcast packet circles back to node 100I, the node 100I recognizes that it originated the packet and does not forward it further. Although a specific store and forward process has been described here, one skilled in the art will realize that there are many ways to transfer the unique identifiers between the nodes depending on the underlying physical layer protocol used in the network.

In the Talon ring embodiment, step 230 is implemented via an address table, as illustrated in FIG. 4A. Each row in address table 400 is a record, with each record corresponding to one of the nodes in the network. Each record includes three fields. Field 410 identifies the node, field 420 contains the unique identifier for the node (i.e., MAC address in this example), and field 430 identifies the corresponding network address for the node (i.e., IP address). In one embodiment, address table 400 is implemented in a sorted list. However, other data structures and storage mechanisms, including databases, could be used to implement the address table.

In this particular implementation of step 230, the unique identifiers for the various nodes are inserted 232 into the address table. For example, if node 100K receives 10.10.2 as the MAC address for node 100H, it inserts 232 this into the record for node 100H, as shown in FIG. 4A. Once all the nodes have received the MAC addresses broadcast by all the other nodes in the network, the address table in each node will contain the same entries in field 420.

Each node then assigns a network address to each of the nodes in the address table, based on the unique identifier for that node. The assigned network addresses are inserted 234 into the address table. Each node does the assignment in the same way so that all of the resulting address tables are the same (e.g., node 100J is, assigned IP address 127.0.0.3 in each node). In one embodiment, the IP addresses are assigned sequentially from a list of available IP addresses stored in the node. For example, in FIG. 4A, the loopback IP addresses, 127.x.x.x, are assigned to the nodes. Node 100H has the lowest MAC address and so gets the first IP address 127.0.0.0, node 100I gets the second IP address, and so on. The assignment could also be made in a sequentially decreasing order with respect to the MAC address and/or the IP address (e.g., lowest MAC address gets highest IP address, or other combinations).

In the example above, the loopback IP addresses 127.x.x.x, are assigned to the nodes. This address range is beneficial because it will not conflict with IP addresses used in other public or private nodes that are connected to the network nodes configured using the present invention. In an alternative embodiment, it may be beneficial for the nodes to communicate with other network nodes that have IP addresses assigned from a block of IP addresses reserved for private networks. In this case, the addresses assigned by the present invention should be taken from the block of IP addresses being used by the other private network nodes. In another embodiment, it may be desirable to have the nodes accessible to the public. In this case, the IP addresses assigned to the nodes should come from the public IP addresses. In each embodiment above, the addresses assigned to the nodes preferably do not conflict with addresses assigned to any other nodes in the network.

In a preferred embodiment, the network addresses are assigned in each node every 5 seconds. If the nodes do not have a global clock, the 5 second intervals will not be synchronized and each node will update the address table at a different time. This could lead to momentary inconsistencies between the address tables of the various nodes. However, these inconsistencies are temporary and generally do not significantly impair the operation of the network.

In one embodiment of the invention, the network addresses for one or more of the nodes are manually configured by a network administrator or other user. When this occurs, the node includes the manually configured network address in the broadcast packet along with its unique identifier. When this broadcast packet is received by the other nodes in the network, they add the unique identifier to the address table as before but also set the network address with the manually configured network address included in the broadcast packet. When the node later goes to assign network addresses, the node recognizes the network addresses that have been manually configured and does not change the network address assigned to those nodes. In addition, the node also will not assign the manually configured network addresses to any of the other nodes. Once again, since each node receives the manually configured address in the broadcast packet, the nodes behave the same and create the same address tables. This same approach is applicable to all situations in which certain network addresses are permanent (i.e., not to be changed by the nodes in their automatic assignment of network addresses).

In another embodiment, the network administrator or other user can specify a range of addresses that are assigned to the nodes. For example, instead of using the loopback IP address range 127.x.x.x, the network administrator might want the nodes to be available to other nodes in a private network. Thus, the network administrator would specify a range of the reserved IP addresses for private networks that should be assigned to the nodes. This is advantageous because it allows other nodes in the private network to access the nodes configured using the present invention. In another embodiment, the network administrator might want to make the nodes publicly accessible. This can be accomplished by specifying a range of public IP addresses that should be used in place of the loopback address range.

Figure 3:
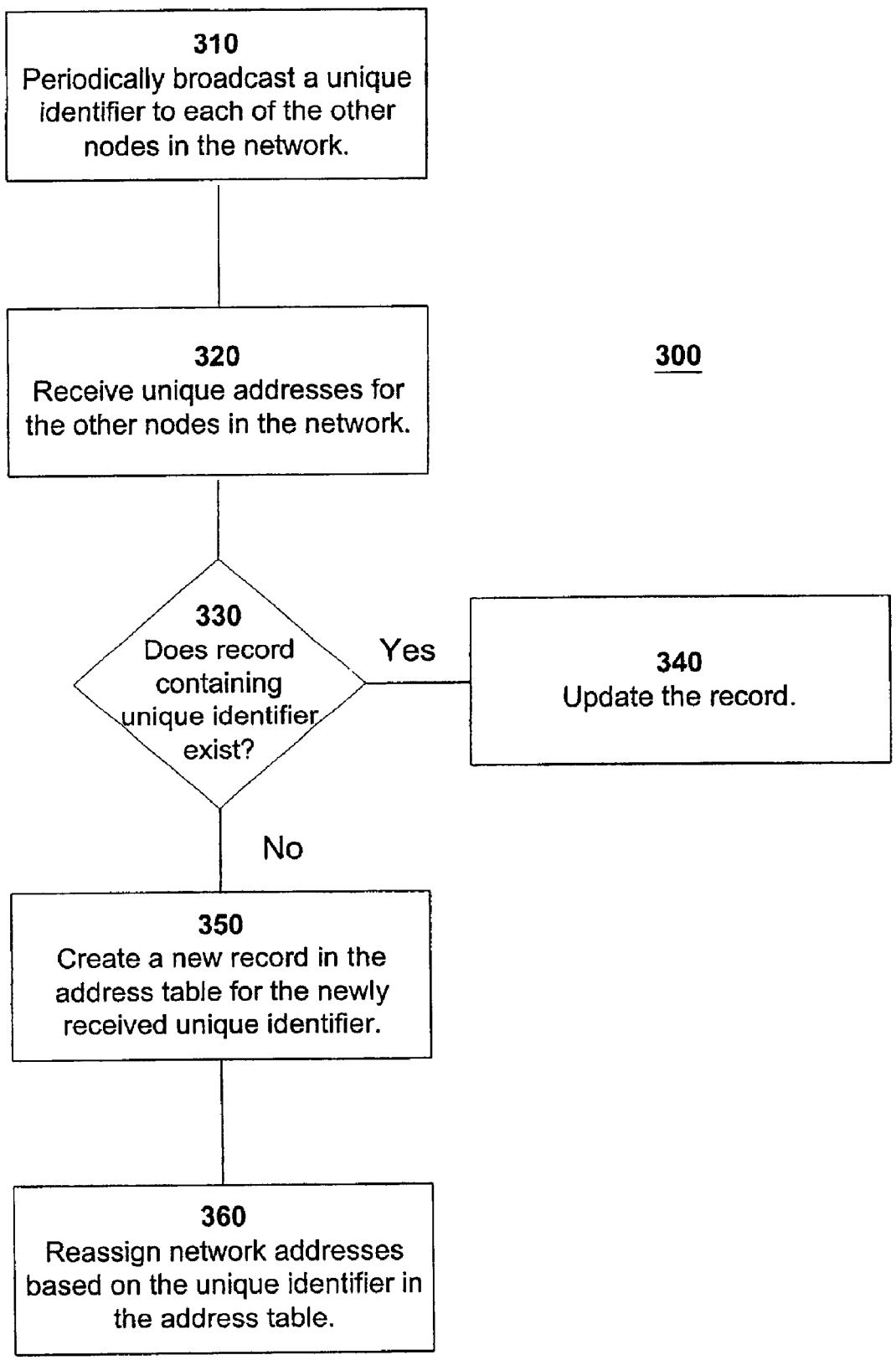
FIG. 3 is a flow diagram illustrating another method for assigning addresses to nodes according to the invention.

FIG. 3 is a flow diagram of another method for assigning addresses according to the present invention. In this approach, each node 100 periodically broadcasts its unique identifier to the other nodes in the network. This periodic broadcasting facilitates the addition and/or removal of nodes from the network without disrupting the network. The address tables in the remaining nodes are automatically updated to reflect the added and deleted nodes, including reassigning network addresses in certain cases.

Method 300 will be described in the context of the Talon ring embodiment and the address table 415 shown in FIG. 4B, although it has the same broad applicability as method 200 of FIG. 2. Address table 415 in FIG. 4B is similar to address table 400, except that it contains two additional fields for each record. Field 440 is a time to live field and field 450 is an expiration flag. The time to live field 440 for a record indicates the time remaining until the record expires. The expiration flag indicates whether a record has expired. In this case, a value of 1 indicates an expired record and a value of 0 indicates an unexpired record. When the time to live field 440 counts down to zero, the expiration flag is set to 1 and the record has expired.

Returning to FIG. 3, in steps 310 and 320, each node periodically broadcasts 310 its unique identifier to each of the other nodes in the network and receives 320 the unique identifiers for the other nodes. In the Talon ring embodiment, the MAC address is broadcast to the other nodes every 4.5 seconds using a store and forward approach.

In step 330, each unique identifier received is compared to the unique identifiers already contained in the address table. If an existing record contains the unique identifier, the node executes step 340. However, if there is no such record, this indicates a new unique identifier and step 350 is executed instead.

In step 340, the record containing the unique identifier is updated, including updating one or more fields in the record. In the Talon ring embodiment, the node resets the time to live field 440 to 15 seconds. As mentioned previously, the nodes broadcast their unique identifiers every 4.5 seconds. Thus, a node essentially has three chances to broadcast its unique identifier to another node before the time to live field expires. This provides some leeway for lost or corrupted data packets. However, once the time to live field for a node expires, it is assumed that the node is no longer reachable and the entry for that node is marked as expired in the expiration field 450. Expired records are not necessarily immediately purged. Thus, if the record containing the recently received unique identifier is currently expired, not only is the time to live field reset but the expiration flag is also reset in order to reactivate the record.

The reset value for the time to live field 440 and the time interval between broadcasts may be different for different embodiments. However, the reset value for the time to live field is 440 should be greater than the time interval between broadcasts and preferably is at least twice as long as the time interval between broadcasts. This provides each node with at least two chances to broadcast their unique identifier before the corresponding record is marked as expired in the address tables of the other nodes. Thus, if a broadcast packet is corrupted during transmission and not received by the other nodes in the network, the node will have a second chance to broadcast its unique identifier prior to being removed from the address tables of the other nodes.

Returning to step 330, if a record containing the unique address received by the node does not currently exist in the address table, this means that the unique identifier is new. This typically occurs if the corresponding node has been recently added to the network (e.g., a hot insertion), an existing node has been assigned a new unique address, or the record for an existing node had previously expired for so long that it was purged from the address table. In any event, a new record containing the new unique identifier is created 350 and the automatic configuration process then proceeds to step 360.

As mentioned above, a new unique address could result when an existing node is assigned a new unique address. For example, when using a MAC address as the unique address, a hardware replacement in a node, such as a chassis replacement, can result in a new unique address (MAC address) for that node because the new hardware has a new MAC address. In this example, this situation is handled in the same way as the insertion of new equipment. The nodes receive the new unique address and create a record in the address table for this unique address in step 350 of method 300. A network address is assigned in step 360. The old record (i.e., the one with the old MAC address) eventually expires since the old MAC address is no longer broadcast.

In step 360, the network addresses are reassigned based on the unique identifiers contained in the address table. In the Talon ring embodiment, network addresses are reassigned only for unexpired records and only when a new record is created. If an existing record expires, there is no reassignment of network addresses. Rather, the remaining nodes in the network handle the expiration of a record simply by not sending messages to the expired node, but the network addresses for the remaining nodes are unchanged. Expired records are purged from the address table when a reassignment of network addresses occurs (in this case, when a new record is created).

Thus, consider the case of a hot deletion. Referring to FIG. 4B, assume that when the network is first brought up, nodes 100H-100K are all active. The resulting address table has four records, one for each node, and IP addresses are assigned to each node based on its MAC address, as shown in FIG. 4B. All four records initially are marked as unexpired (i.e., time to live of 15 seconds and expiration flag set to 0). Note that FIG. 4B does not show this status for the time to live fields and expiration flags.

Now assume that node 100I is removed from the network. Since each node is expected to broadcast its MAC address every 4.5 seconds, all the nodes in the network will detect that node 100I has been removed because its time to live field eventually expires, as indicated by the 0 in the time to live field and 1 in the expiration flag field of FIG. 4B. As an aside, note that in FIG. 4B, the time to live field for node 100K is 10.5, indicating that one broadcast has been missed but the record for node 100K has not yet expired.

Returning to the record for node 100I, the record is maintained in the address table but is marked as expired, indicating that node 100I is no longer reachable. Note that the other IP addresses need not be reassigned at this point, since the deletion of node 100I does not affect the integrity of the other IP addresses. This is advantageous because the less often that IP addresses are assigned, the fewer chances there are of something going wrong. In addition, if node 100I is later reinserted (or if it expired because of a temporary failure which lasted more than 15 seconds and the failure is then fixed), it will begin to broadcast its MAC address again. The other nodes accommodate this by resetting the time to live field and expiration flag. The old IP address is still useable since it has not been reassigned.

Now, assume that node 100I has been removed from the network, resulting in the address table of FIG. 4B, and then another node 100L is added to the network. Node 100L broadcasts its MAC address. Since there is no record containing node 100L's MAC address, the other nodes create a new record for node 100L, purge the expired records, and then reassign IP addresses. The result is the address table shown in FIG. 4C. The record for node 100I has been purged in part because its old IP address is no longer reusable, as it has been reassigned to node 100K. Thus, if node 100I reenters the network, it is not sufficient to reset its time to live and expiration flag fields. Purging the record prevents this from accidentally occurring.

Figure 6A:
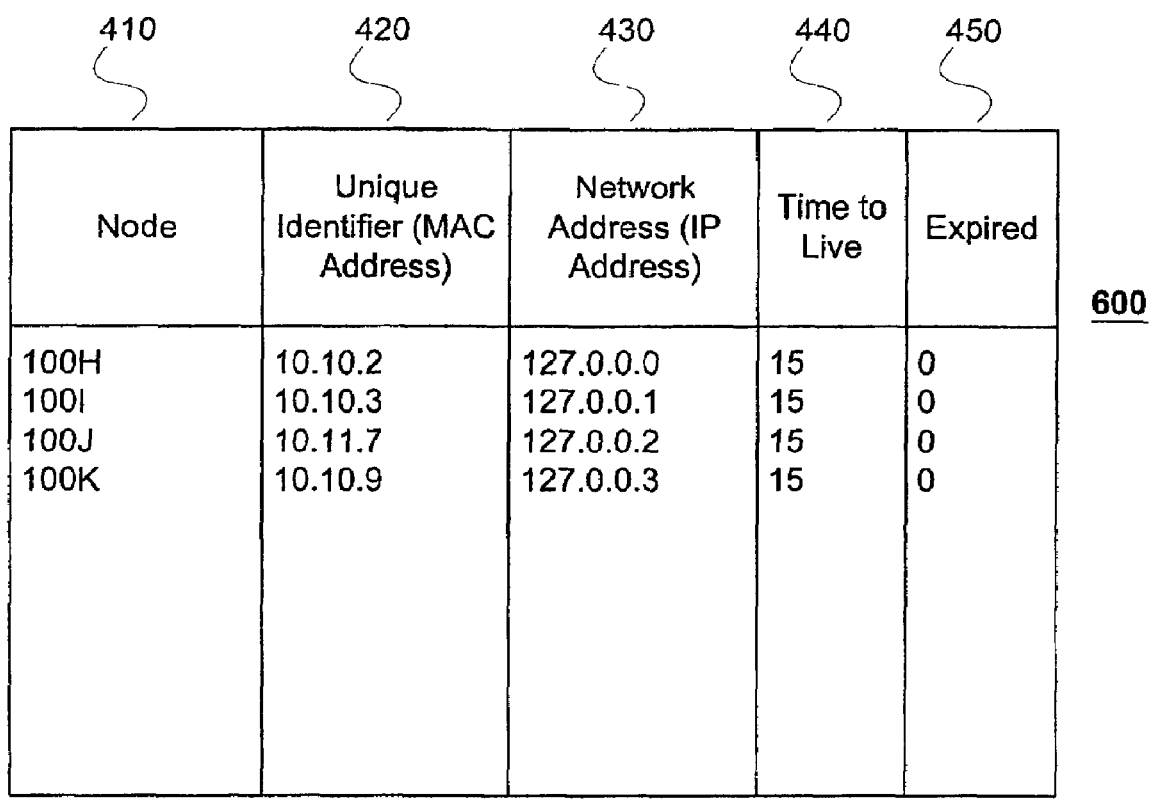

In another embodiment of the invention, a proxy mechanism is used to ensure that the address tables are the same for each of the nodes in the network when a node has expired. Returning to FIG. 1B, suppose that nodes 100H-K have broadcast their unique identifiers and have each created address table 600 shown in FIG. 6A. Now suppose that nodes 100J and 100K are removed from the network. As illustrated in address table 610 of FIG. 6B, nodes 100H and 100I maintain the same address table but the entries for nodes 100J and 100K are marked as expired since the time to live field for these nodes has expired.

Now suppose that node 100K is reconnected to the network. When this happens, node 100K broadcasts its unique identifier to the other nodes in the network and receives the unique identifiers from nodes 100H and 100I. In the absence of any proxy mechanism, node 100K would create address table 620 in FIG. 6C from the unique identifiers received. Address table 620 contains records for nodes 100H, 100I and 100K but does not have a record for node 100J since node 100K did not receive a unique identifier from node 100J. However, when nodes 100H and 100I receive the unique identifier broadcast by node 100K, they update the expired field and the time to live field for node 100K, resulting in address table 630 illustrated in FIG. 6D. Note that the record for node 100J is still present in address table 630. Since address table 620 contains different records than address table 630, inconsistent addresses are assigned in address tables 620 and 630.

A proxy mechanism is used to ensure that node 100K's address table matches the address tables of the other nodes in the network. The proxy mechanism operates by supplying the expired records to the nodes that do not have them. In the example described above, the proxy mechanism provides node 100K with the record for expired node 100J. Node 100K includes the record into its address table resulting in address table 630. As a result, the address tables are the same in each node, therefore, the address assignment will be the same in each node.

In one embodiment, when the record for a node expires, the node above that node in the address table (or the last node in the address table if the record for the top node expires) becomes a proxy node for the expired node. The proxy node broadcasts the unique identifier for the expired node to the other nodes in the network. The broadcast also contains a field that identifies the packet as a proxy packet. Thus, when the other nodes receive this packet they will recognize that this is a proxy packet and will set the expired field for this node when/if they store the unique identifier in their address tables.

Note that the records for nodes 100J and 100K were not purged from the address tables of nodes 100H and 100I since no new nodes were introduced into the network. Even though node 100K went offline and was marked as expired, when it came back online, nodes 100H and 100I treat it as an existing node since it is already in their address table. If the proxy mechanism did not inform node 100K of the expired record for node 100J, node 100K would assume node 100J was a new node when it powered on. As a result, node 100K would purge all expired records from the address table and would reassign the network addresses but the other nodes in the network would not because node 100J is not a new node for them. This could also result in conflicting addresses for the same node.

Figure 5:
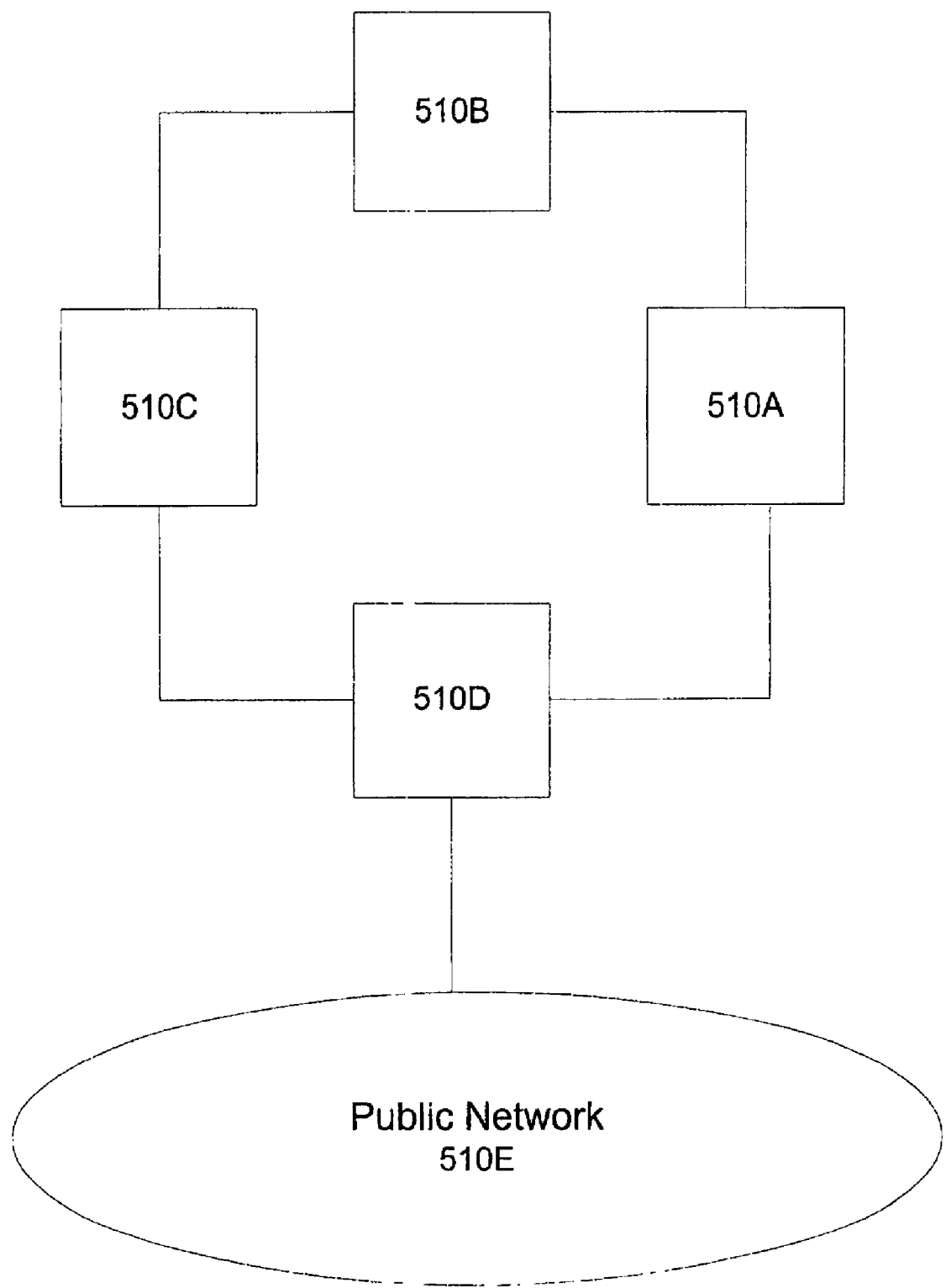
FIG. 5 is a block diagram of a private network connected to a public network through a gateway node.

In a preferred embodiment of the invention, the methods described above are implemented in a private network of nodes. A private network is a network in which the IP addresses for the nodes are not known to any of the devices outside of the network. In another embodiment, one or more of the nodes in the network is configured as a gateway connecting the private network with a public network, such as the Internet. This configuration is illustrated in FIG. 5. In this figure, nodes 510A-C make up the private portion of the network. The IP addresses that are used to address these nodes are the private network addresses that have been set aside for this purpose. An example of private IP network address range includes 127.x.x.x. Since the private network nodes do not have public IP addresses, they cannot be directly addressed by nodes outside of the private network.

Node 510D is a gateway node that connects the private network with the public IP network 510E (such as the Internet). Node 510D has two IP addresses associated with it. The first is a public IP address that is used to send and receive information from the public IP network. The second is a private IP address that is used to send and receive information between the gateway node and the nodes in the private network. Nodes 510A-D would all participate in the assignment of addresses described previously.

Using the automatic assignment of addresses method above is advantageous in private networks for a number of reasons. First, traditional IP networks require a network administrator to oversee the network configuration. The network administrator manages the nodes and sets up the addressing for the nodes. Additionally, IP networks require the use of a server to manage large groups of nodes in the network. The server introduces a single point of failure for the entire network. Since a group of nodes is reliant on the server, if the server goes down, the network cannot function correctly.

The automatic assignment method described above relieves the network administrator of having to manually assign addresses. It also removes the server from the network. Each of the nodes will have the same information as all of the other nodes. Thus, if a particular node becomes inoperable, the other nodes can continue to function without it. This is important for networks that make up the backbone of the network or private networks that need to function at all times.

Another advantage of this invention is that it provides a mechanism for private networks to use the IP networking without the significant overhead normally associated with IP networks. As mentioned previously, due to the increased use of the IP protocol, many applications are available for IP. The present invention allows the use of IP in server-less networks, which allows these networks to take advantage of the applications developed for IP networks.

Although the invention has been described in detail with reference to certain preferred embodiments thereof, other embodiments are possible. For example, although certain embodiments have been described with reference to IP networking, the approaches described may be used in any server-less network wherein the underlying physical layer protocol supports broadcasting of packets, regardless of the network protocol or addressing scheme. Therefore, the scope of the appended claims should not be limited to the description of the preferred embodiments contained herein.

What is claimed is:

1. A computing system comprising:
a plurality of nodes; and
a network coupling said plurality of nodes;
wherein each of said nodes is configured to:
periodically broadcast a unique identifier for the node to other nodes of the plurality of nodes, wherein each node has a different unique identifier;
receive unique identifiers for the other nodes; and
in an address table comprising a plurality of records, each record corresponding to one of the nodes in the plurality of nodes and including a unique identifier for the node and a network address for the node:
if a record containing the unique identifier does not exist,
create a new record and
insert the received unique identifier into the record; and
if a record containing the unique identifier does exist, update the record; and
reassign the network addresses in the records based on the unique identifiers in the records, wherein each node of the plurality of nodes determines which network address to assign to each record in a common predetermined manner.

2. The system of claim 1, wherein to reassign the network addresses in the records, each of said nodes is configured to:
determine which records are unexpired; and
reassign the network addresses only for unexpired records.

3. The system of claim 1, wherein each of said nodes is configured to reassign the network addresses only when a new record is created.

4. The system of claim 1,
wherein the record for a node further includes a time to live field indicating a time remaining until an expiration of the record; and
wherein updating the record comprises resetting the time to live field for the record.

5. The system of claim 4,
wherein in periodically broadcasting a unique identifier to the other nodes all nodes of the plurality of nodes are configured to broadcast their unique identifiers once per a time interval; and
wherein in resetting the time to live field the time to live field is reset to a value at least two times as long as the time interval.

6. The system of claim 4, wherein reassigning the network addresses in the records comprises:
marking a record as expired when the time to live field for that record expires; and
reassigning the network addresses only for unexpired records.

7. The system of claim 1, further comprising a proxy mechanism configured to proxy unique addresses for records which have expired but have not been purged.

8. The system of claim 1, wherein each node in the plurality of nodes is configured to independently determine a network address for at least each other node in the plurality of nodes using the periodically broadcast unique identifiers from each of the other nodes in the plurality of nodes and using the common predetermined manner.

9. The system of claim 1, wherein:
the unique identifier includes a Media Access Control (MAC) address and the network address includes an Internet Protocol (IP) address;
the nodes are coupled to form a ring;
the record for a node further includes a time to live field indicating a time remaining until expiration of the record;
in periodically broadcasting a unique identifier to the other nodes, each node is configured to:
receive the MAC address;

store the MAC address and retransmit the MAC address to a next node on the ring, if the node did not originate the broadcast of the MAC address; and not retransmit the MAC address, if the node did originate the broadcast of the MAC address;

updating the record comprises resetting the time to live field for the record; and reassigning the network addresses in the records comprises:

marking a record as expired when the time to live field for that record expires; and sequentially assigning IP addresses only for unexpired records and only when a new record is created.

10. A node for use in a computing system comprising:

a transmitter configured to convey data to other nodes of the computing system;

a receiver configured to receive data from other nodes of the computing system; and an address table comprising a plurality of records, each record corresponding to one of the nodes of the computing system and including a unique identifier for a corresponding node and a network address for the corresponding node;

wherein the node is configured to:

periodically broadcast a unique identifier that corresponds to itself to other nodes via the transmitter;

receive unique identifiers for the other nodes via the receiver; and if a record containing a received unique identifier does not exist, create a new record and insert the received unique identifier into the record; and if a record containing the received unique identifier does exist, update the record; and reassign the network addresses in the records based on the unique identifiers in the records, wherein the node determines which network address to assign to each record in a common predetermined manner.

11. The node of claim 10, wherein to reassign the network addresses in the records, said node is configured to:

determine which records are unexpired; and reassign the network addresses only for unexpired records.

12. The node of claim 10, wherein said node is configured to reassign the network addresses only when a new record is created.

13. The node of claim 10, wherein the record for a node further includes a time to live field indicating a time remaining until an expiration of the record; and wherein updating the record comprises resetting the time to live field for the record.

14. The node of claim 13, wherein the node is configured to broadcast its unique identifier once per a time interval; and wherein in resetting the time to live field the time to live field is reset to a value at least two times as long as the time interval.

15. The node of claim 13, wherein in reassigning the network addresses in the records, the node is configured to:

mark a record as expired when the time to live field for that record expires; and reassign the network addresses only for unexpired records.

* * * * *